United States Patent
Glaub

(10) Patent No.: US 11,618,354 B2
(45) Date of Patent: Apr. 4, 2023

(54) SEAT SYSTEM SAFETY WITH ENERGY MANAGEMENT SEAT SUSPENSION

(71) Applicant: Energy Management Subsystems LLC, Shelby Charter Township, MI (US)

(72) Inventor: Jeffrey L. Glaub, Shelby Townsip, MI (US)

(73) Assignee: Energy Management Subsystems LLC, Shelby Charter Township, MI (US)

( * ) Notice: Subject to any disclaimer, the term of this patent is extended or adjusted under 35 U.S.C. 154(b) by 261 days.

(21) Appl. No.: 17/093,848

(22) Filed: Nov. 10, 2020

(65) Prior Publication Data

US 2021/0138938 A1     May 13, 2021

Related U.S. Application Data

(60) Provisional application No. 62/934,223, filed on Nov. 12, 2019.

(51) Int. Cl.
*B60N 2/427* (2006.01)
*B60N 2/50* (2006.01)
*B60N 2/42* (2006.01)

(52) U.S. Cl.
CPC ....... *B60N 2/42709* (2013.01); *B60N 2/4242* (2013.01); *B60N 2/502* (2013.01)

(58) Field of Classification Search
CPC ... B60N 2/4242; B60N 2/502; B60N 2/42709
See application file for complete search history.

(56) References Cited

U.S. PATENT DOCUMENTS

| | | | | |
|---|---|---|---|---|
| 4,138,157 A | * | 2/1979 | Pickett | B60R 22/16 297/472 |
| 4,685,738 A | * | 8/1987 | Tinus | A47C 7/26 297/452.64 |
| 4,910,817 A | * | 3/1990 | Kita | B29C 66/135 160/DIG. 15 |
| 5,669,661 A | | 9/1997 | Pajon | |
| 6,789,844 B1 | * | 9/2004 | Dennis | B60N 2/4242 297/452.56 |
| 6,964,451 B1 | * | 11/2005 | Bergey | B60N 2/4242 296/68.1 |

(Continued)

FOREIGN PATENT DOCUMENTS

WO     2012066275 A1     5/2012

*Primary Examiner* — Anthony D Barfield
(74) *Attorney, Agent, or Firm* — Young Basile Hanlon & MacFarlane, P.C.

(57) ABSTRACT

A seat bottom assembly including a seat bottom frame having a front side and a back side, a seat plate having a front side and a back side, webbing stitches, and tear away stitches. The back side of the seat plate is coupled to the back side of the seat bottom frame. The webbing straps are coupled to and extending between the front side of the seat bottom frame and the front side of the seat plate, and tear away stitches connect two points of the webbing straps along a longitudinal axis so that the webbing straps are partially looped at locations of the respective tear away stitches. The tear away stitches separate and increase a length of the webbing straps in response to experiencing a threshold load in a direction perpendicular to the seat plate.

20 Claims, 9 Drawing Sheets

(56) References Cited

U.S. PATENT DOCUMENTS 7,134,718 B2 11/2006 Yasuda et al.
7,309,103 B2 12/2007 Nelson et al.
8,267,471 B2 9/2012 Reel

* cited by examiner

SEAT SYSTEM SAFETY WITH ENERGY MANAGEMENT SEAT SUSPENSION

CROSS-REFERENCE TO RELATED APPLICATION(S)

This application claims priority to and the benefit of U.S. Provisional Application Patent Ser. No. 62/934,223, filed Nov. 12, 2019, the entire disclosure of which is hereby incorporated by reference.

TECHNICAL FIELD

The present disclosure relates to seat suspensions and assemblies that are subject to high impact forces.

BACKGROUND

Seated occupants restrained in vehicles are subjected to high impact impulses as a result of unscheduled events. Events include rear collisions, front collisions, side collisions, vehicle rollovers, and underside impacts. Relevant vehicles may include helicopters, automobiles, airplanes, trains, or tanks. Particularly, military and industrial vehicle experience more high impact forces and protection from the forces is desirable. During such events, the safety of the occupant from unexpected forces is desirable. Particularly, additional barriers and protections are desirable for restrained occupants. Devices that account for the degree, timing, and positioning of the unexpected high impact forces are lacking. Managing the effects of the loads before high impact events occur would be useful for reducing overall impacts to the vehicle occupants.

SUMMARY

Disclosed herein are implementations of a seat bottom assembly including a seat bottom frame having a front side and a back side, a seat plate having a front side and a back side, webbing stitches, and tear away stitches. The back side of the seat plate is coupled to the back side of the seat bottom frame. The webbing straps are coupled to and extending between the front side of the seat bottom frame and the front side of the seat plate, and tear away stitches connect two points of the webbing straps along a longitudinal axis so that the webbing straps are partially looped at locations of the respective tear away stitches. The tear away stitches separate and increase a length of the webbing straps in response to experiencing a threshold load in a direction perpendicular to the seat plate.

The seat bottom assembly may further include ratchets coupled to a bottom surface of the front side of the seat plate and the webbing straps, and the ratchets may tighten the webbing straps. The ratchets may be coupled to the front side of the seat plate by a bolt so that the seat plate distributes loads applied to the ratchets, the webbing straps, or both. The webbing straps may be coupled to the front side of the seat bottom frame by wrapping around the front side of the seat bottom frame. The seat bottom assembly may further include buckles securing the webbing straps around the front side of the seat plate, and the buckles may adjust slack of the webbing straps. The seat bottom assembly may further include sheathing secured around the front side of the seat bottom frame and between the seat bottom frame and the webbing straps, and the sheathing may protect the webbing straps from rubbing against sharp edges of the seat bottom frame. Each of the webbing straps may include at least three tear away stitches that connect different points of the webbing straps. The seat bottom assembly may further include stiffeners securing the webbing straps and preventing lateral movement of the webbing straps. The stiffeners may be secured to each webbing strap by join sews, and the join sews may prevent sliding movement of the stiffeners along each of the webbing straps. The seat plate may be welded to the seat bottom frame at a back side, a right side, and a left side, and when a load a threshold load is experienced, the seat plate may remain welded to the seat bottom frame.

Disclosed herein are implementations of a seat top assembly including a seat top frame having a top side, a bottom side, and lateral sides and a seat plate having a top side, a bottom side, and lateral sides. The top side and the lateral sides of the seat plate are secured to the top side and a portion of the lateral sides of the seat top frame. The seat top assembly may include webbing straps extending between the bottom side of the seat top frame and the bottom side of the seat plate. Each of the webbing straps includes tear away stitches connecting at least two portions of the respective webbing strap along a longitudinal axis of the tear away stitches so that a partial loop is formed in the webbing strap, and the tear away stitches release when a threshold force is applied to the seat plate or the webbing strap. The seat top assembly includes a hook-to-jaw turn buckle connecting the webbing strap and the bottom side of the seat plate.

The seat top assembly may further include stiffeners securing each of the webbing straps together so that horizontal movement of the webbing straps is prevented within the seat top frame. Each of the webbing straps may further include a D-ring connecting the hook-to-jaw turn buckle and the bottom side of the seat plate, and the D-ring, the hook-to-jaw turn buckle may adjust slack of the webbing strap. Each of the webbing straps may further include a gated buckle securing a loop of the webbing strap that is wrapped around the top side of the seat top frame. Each of the webbing straps may further include detents positioned along the webbing strap and oriented toward the seat top frame, and the detents may be locators for the gated buckle so that the gated buckle is spaced a distance from the top side of the seat top frame.

Disclosed herein are implementations of a seat assembly including a seat top assembly having a top edge, side edges, and a bottom edge and a seat bottom assembly having a rear edge connecting with the bottom edge of the seat top assembly. The seat bottom assembly includes a seat bottom frame defining a front edge, the rear edge, and side edges of the seat bottom assembly. The seat bottom assembly includes a seat plate connecting with the rear edge and a portion of the side edges of the seat bottom frame and extending toward the front edge along the side edges. The seat bottom assembly includes webbing straps connecting the front edge of the seat bottom frame and the seat plate and tear away stitches connecting two or more points of the webbing straps along a longitudinal axis of the webbing straps so that the webbing straps are securely gathered at locations of the respective tear away stitches. The tear away stitches separate and increase a length of the webbing straps in response to experiencing a threshold load in a direction perpendicular to the seat plate.

The seat bottom assembly may further include stiffeners perpendicularly secured to the webbing straps and positioned between the seat plate and the seat bottom frame, and the stiffeners may be horizontally spaced from each of the webbing straps at a consistent distance between each of the webbing straps. The seat bottom assembly may further include ratchets connecting each of the webbing straps with the seat plate, and the ratchets may tighten the webbing straps against the seat plate. The seat bottom assembly may further include gated buckles securing loops for each of the webbing straps, and each of the loops may be wrapped around the front edge of the seat bottom assembly. The seat top assembly may further comprise a seat top frame defining the top edge, the side edges, and the bottom edge of the seat top assembly and a seat top plate having a top edge, side edges, and a bottom edge. The top edge and the side edges of the seat top plate may be secured to the top edge and the side edges of the seat top frame. The seat top assembly may further include webbing straps connecting the bottom edge of the seat top plate and the bottom edge of the seat top frame and tear away stitches releaseably connecting at least two portions of the webbing straps so that webbing straps are securely gathered at the respective tear away stitches. The tear away stitches of the seat top assembly may release when a threshold force is applied to the webbing straps or the seat top plate.

DETAILED DESCRIPTION

Figure 1:
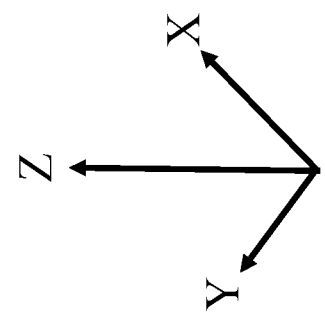
FIG. 1 is a perspective view of a seat without foam and trim material.
Figure 1:
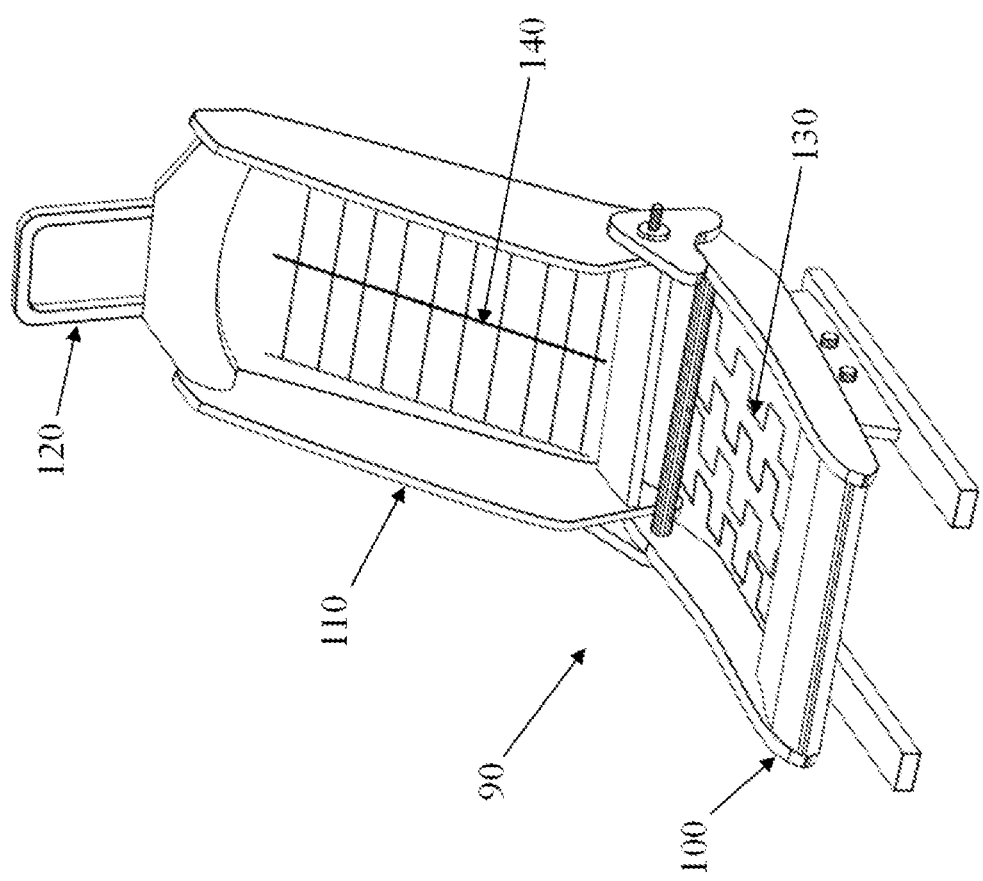

Occupants are subject to forces that act upon a vehicle. These forces create loads, and the loads propagate throughout the vehicle, eventually acting on seat structure before being applied to seated occupants. During this consequential series of events, equal and opposite reactions occur, and managing the reactions from the loads acting on various objects is managed in order to minimize the loads experienced by the restrained occupants. Before a load is induced onto an occupant, the underbody, vehicle structure, floor, and seat structure each go through a series of equal and opposite reactions. There are a multitude of variables that are unique for each event, such as degree of force, size and structure of the vehicle, seat structure and attachment scheme, and a distance the restrained occupant is located from an impact force. During the consequential series of events, +G forces accelerate the restrained occupant to a +Z travel with maximum G force load before attaining a zero G accelerated state. After acceleration has stopped and zero G force is achieved, the occupant decelerates at a −G force rate during the −Z travel and eventually abruptly terminates motion with the occupant impacting a structure that ends the event. Throughout the aforementioned event, cushions provide a buffer for an approximate +G acceleration force applied to a restrained occupant at about 25 Gs and an approximate deceleration force at about 15 Gs. The G value impact onto the restrained occupant can vary depending upon the occupant and the design of the seat. The assemblies disclosed in this application add measures to decrease the total +G forces and −G forces on the occupant so that the occupant suffers fewer injuries.

The timing of maximum G forces impacts the safety standards implemented. In a laboratory scenario impulse, impulses initiate at approximately 5 msecs. In the field, scenario impulses are induced onto the restrained occupant later as a result of the load mitigates throughout the vehicle. In lab scenarios, peak forces are induced within 15 msecs for acceleration and 28 msecs for the deceleration of the restrained occupant understanding the time associated with the event is helpful for determining how to manage the load induced onto the occupants. The present disclosure aims to deploy an assembly that absorbs the impulses for longer periods so that the impulses are sufficiently mitigated before contacting the occupant. Thus, the occupant would endure a lesser injury.

The challenge is reducing the impulses induced onto the occupant without violating injury tolerance of the occupant. The result of a high impact event induces severe impulses onto the seated occupant very rapidly. Occupants in the population are comprised of a vast array of sizes, shapes, and masses. The population is defined as either the central 90% of the population, typically, or from the $5^{th}$ percentile female to the $95^{th}$ percentile male in anthropometrics. Occupants are should be protected according to the Federal Motor Safety Standard (FMVSS) 208 and MIL-STD-1492. FMVSS 208 requires seat systems to minimize the impulses induced upon the restrained occupants and MIL-STD-1492 for Human Engineering requires military vehicles to provide protection for occupants that are exposed to G-loading of greater than 6.0 G and greater than −3.0 G. The threshold for injury is measured at several locations of the human body including the head, spinal, and thoracic regions. Ensuring any injury will not occur to the restrained occupant is not practical, but the challenge is to implement safeguards to reduce the likelihood for dangerous bodily harm.

Seats are used in the transportation industry and are comprised of sub-systems and components which include trim covers, foam pad assemblies, seat suspensions, and frame assemblies. The three primary seat sub-systems are a seat bottom, seat back, and head restraint. These sub-systems work together managing loads before impulses are induced onto a seated occupant. The present disclosure describes seat bottom assemblies and seat back assemblies collectively referred to as energy management seat suspension ("EMSS") assemblies. The EMSS assemblies can include two or more independent assemblies, for example, the seat bottom assembly, the seat back assembly, the head restraint assembly, or any combination thereof. Additional techniques are provided for the installation and performance of the EMSS components, sub-assemblies, and assemblies. This disclosure includes details of the assemblies, possible materials used to manufacture the components, and how a restrained occupant reacts to EMSS assemblies during a high impact event.

Unless specifically referenced differently, EMSS assemblies 95, 97 refer interchangeably to the seat bottom assembly 95, the seat back assembly 97, or both. Reference to the EMSS assembly 95, 97 is interchangeable with a seat assembly. A seat bottom assembly 95 and a seat back assembly 97 may be referred to more broadly as a seat assembly. A seat bottom plate 150 or a seat back plate 290 may be referred to more broadly as a seat plate. A seat bottom suspension 130 or a seat back suspension 140 may be referred to more broadly as a seat suspension. The webbing straps 160 may be used with a seat back assembly 97, a seat bottom assembly 95, or both. Describing any of the elements below with a front side, a back side, a bottom side, a top side, a right side, or a left side references the orientation of a seat 90 when being used by an occupant. The longitudinal axis refers to a line running through the centroid of an object at the longest cross-sectional line of the object that starts at the head of the object and ends at the tail of the object.

Different assemblies for seats are implemented in multiple seat designs used within the industry for transporting different sizes of occupants. Typically, the restrained occupant sits on top of the seat bottom and in front of the seat back trim cover and pad assemblies. Some seats, such as an airplane jump seat, do not have trim covers and cushion or pad assemblies. If trim and cushions or pads including foam are absent in a given seat assembly, the EMSS assemblies 95, 97 can be uncomfortable for the occupants. Regardless, if the trim covers and/or cushion or pad assemblies are absent, the EMSS assemblies 95, 97 provide a basis for securing and transporting many different sizes of occupants. The cushions, pads, trim, or other components are optional but are not shown for clarity. For example, FIG. 1 is used to provide context for seating improvements that are described in additional figures.

FIG. 1 is a perspective view of a seat 90 without foam and trim material. The seat 90 includes a seat bottom frame 100, a seat back frame 110, a head restraint frame 120, a seat bottom suspension 130, and a seat back suspension 140 that supports the seated occupant. The seat bottom suspension 130 and seat back suspension 140 generally support cushions that cover the seat bottom frame 100 and the seat back frame 110. The seat 90 of FIG. 1 is described to provide context for the seat bottom assembly 95 and seat back assembly 97 described herein.

Figure 2:
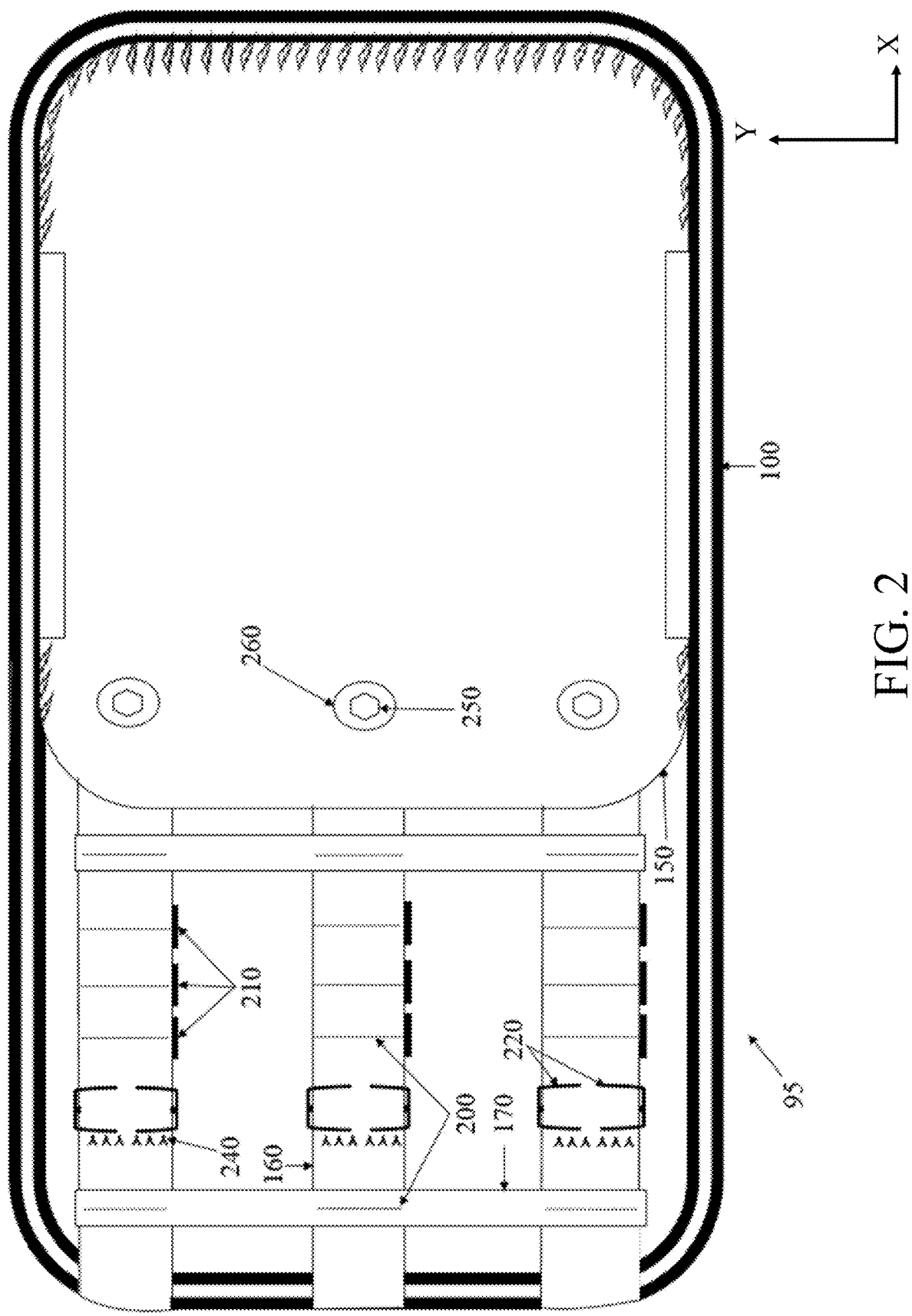
FIG. 2 is a top view of a seat bottom assembly that includes the seat bottom frame of FIG. 1.

FIG. 2 is a top view of a seat bottom assembly 95 that includes the seat bottom frame 100 of FIG. 1. The seat bottom assembly 95 includes a seat bottom plate 150, webbing straps 160, stiffeners 170, and the seat bottom frame 100. The seat bottom plate 150 welds together with a back side, a right side, and a left side of the seat bottom frame 100. The webbing strap 160 with the stiffeners 170 overlap the seat bottom frame 100 by connecting a front side of the seat bottom plate 150 and a front side of the seat bottom frame 100 at a location that is not directly touching the seat bottom plate 150. The webbing straps 160 and the stiffeners 170 are connected by join sews 200. The tear away stitches 210 allow loops or folds of the webbing straps 160 to rip open on the B-surface of the seat bottom assembly 95.

The seat bottom plate 150 may be constructed of a steel material. The steel may vary with the thickness, tensile strength, and elongation properties that are dependent on the structural integrity of the seat bottom frame 100 and the capability for the loads to be applied to activate the seat bottom assembly 95. The seat bottom plate 150 is positioned to the rearward perimeter of the seat bottom frame 100 and has cutouts along the sides that provide a space between the seat bottom frame 100 and the seat bottom plate 150. The seat bottom plate 150 covers approximately half of the surface area of the seat bottom frame 100.

The seat bottom plate 150 is positioned at the rear horizontal section of the seat bottom frame 100. The seat bottom plate 150 may be welded on three sides of the perimeter that interfaces with the seat bottom frame 100. The seat bottom plate 150 may be continuously welded along the rear horizontal section of the seat bottom plate 150 to seat bottom frame 100 that continues along the sides to the cut outs of the seat bottom plate 150. Forward of the cut outs, the seat bottom plate 150 may be spot welded to the seat bottom frame 100 completing the installation of the seat bottom plate 150 to the seat bottom frame 100. Of course, the seat bottom plate 150 may be attached with the seat bottom assembly 95 by any other means that would provide a sturdy connection.

The seat bottom plate 150 provides additional structure and increases support to the seat bottom frame 100 so that the seat 90 has overall increase support to protect an occupant. The additional structure manages the loads in order for the seat assembly 95, 97 to maintain structural integrity throughout an under-body high impact event. Besides the structural integrity, the seat bottom plate 150 also provides a solid basis for the B-surface of the foam pad assemble to nest during the installation of the seat bottom assembly 95. Together, the seat bottom frame 100 and seat bottom plate 150 collectively provide a robust base for the occupant to sit while improving the durability of the seat.

Figure 3:
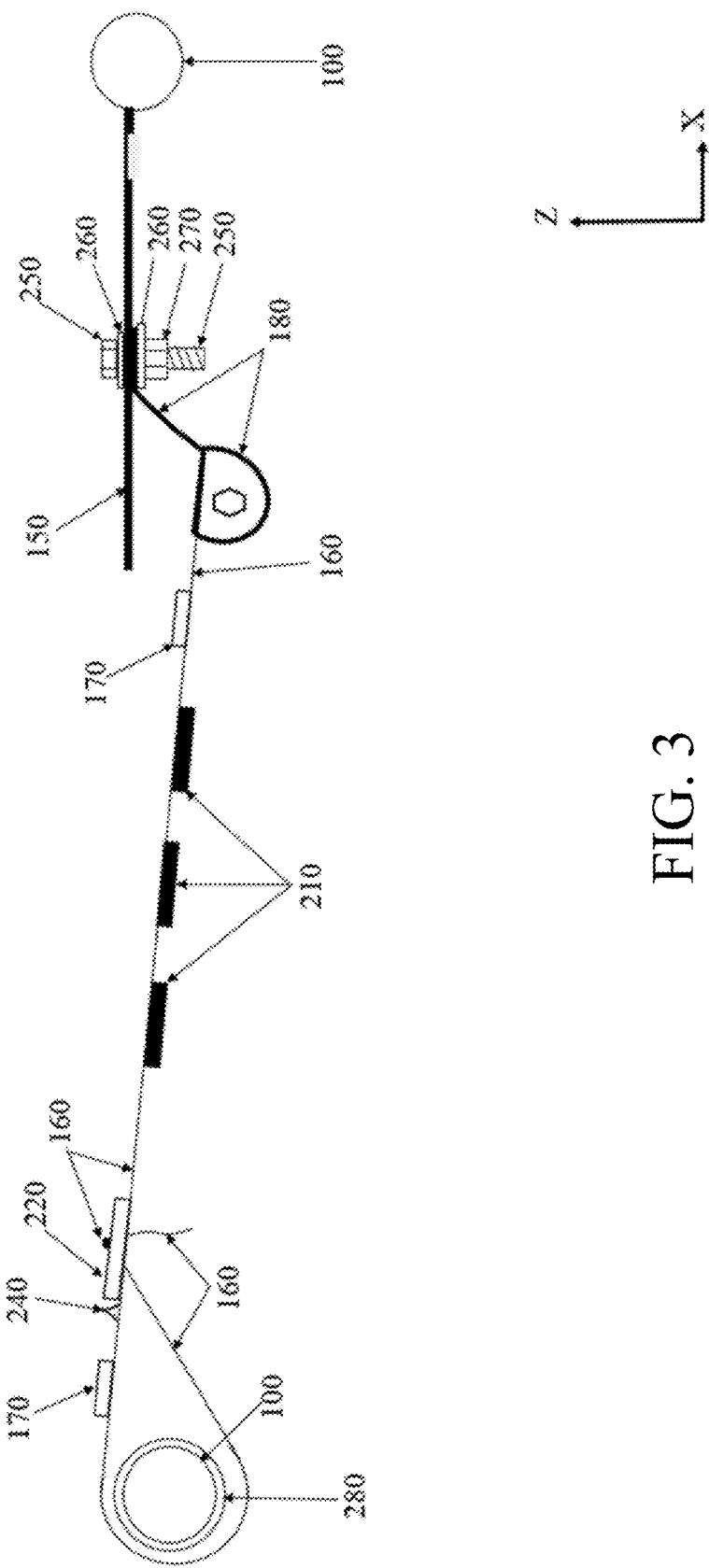
FIG. 3 is a cross-sectional view of the seat bottom assembly of FIG. 2.

The webbing ratchets 180 are attached and secured to the seat bottom plate 150 with bolts 250, washers 260, and nuts 270 and torqued to a specified torque in FIG. 3. The seat bottom plate 150 may include holes, locators (not shown), side cut outs, and a trench (not shown). Two locators are welded onto the on the B-surface of the seat bottom plate 150 to properly locate each of the webbing ratchets 180 onto the seat bottom plate 150. The locators assist with keeping the webbing ratchets 180 in design position when torque is applied to the fasteners that secure the base plates of the webbing ratchets 180 during installation. The locators create a shoulder in X and Y planes to stop the webbing ratchets 180 when torque is applied to the fasteners. Three sets of clearance holes at three locations are added into the seat bottom plate 150. Each set of holes has two holes, approximately ¾-inch in diameter, which may be used for attaching the webbing ratchets 180 to the seat bottom plate 150. The other hole, approximately ⅜-inch in diameter, is useful for securing protective sleeves 190, shown in FIG. 7, of the webbing straps 160. The side cut outs are located on both sides of the seat bottom plate 150. The routed trench is approximately ½-inch×¼-inch routed from side to side on the B-surface of the seat bottom plate 150. The routed trench and side cutouts provide a location for the seat bottom plate 150 to controllably deform and activate the seat bottom assembly 95 during an event.

The seat bottom plate 150 includes the webbing ratchets 180 that are installed onto the B-surface of the seat bottom plate 150. Locators (not shown) are placed on the seat bottom plate 150 to provide the exact location in the X and Y planes to position base plates of the webbing ratchets 180 on the seat bottom plate 150. X and Y planes are used to describe direction or origin location on the seat bottom plate 150. X is used for the forward and rearward location of the seat bottom plate 150, and Y is used for the side to side location of the seat bottom plate 150.

The webbing ratchets 180 may be secured to the B-surface of the seat bottom plate 150. Each webbing ratchet 180 may be installed with the bolt 250, the washers 260, and the nut 270 to a specified torque on the bar of the webbing ratchet 180. During the activation of the seat bottom assembly 95, severe shear loads are applied to the webbing ratchets 180, and additional holes corresponding to the webbing ratchet 180 and the seat bottom plate 150 may be used to manage the loads applied to the attachment scheme. Once the webbing ratchets 180 are installed to the seat bottom plate 150, the webbing ratchets 180 provide a means to secure the webbing straps 160 to the seat bottom assembly 95.

The webbing straps 160 may be comprised of a material similar to Kevlar (e.g., poly-para-phenelyne-terphthalamide) or seat belt webbing (e.g., polyester or polyamides/Nylon) used in the automotive industry. Kevlar has high tensile strength with beneficial elongation properties. The material characteristics are maintained when Kevlar is exposed to environmental properties. Seat belt webbing may be manufactured to meet or exceed stringent safety standards. Generally, the safety standards used include FVMSS 302 for tensile strength and FVMSS 209 for flammability. Seat belt webbing is also resistant to chemicals, moisture, mildew, mold, ultra-violet exposure, etc., and shrinkage. Typically, specialty seat belt webbings are made from either nylon or polyester and are approximately two inches wide and have high tensile strength and good elongation properties to manage loads. The tensile strength may be about 9,000 lbs or more for nylon webbings or 12,000 lbs. or more for polyester webbing. The elongation properties may range between about 6% to about 12.5% range with 3,000 lbs. of dynamic load applied.

The webbing straps 160 may have trade-offs between tensile strength and elongation properties. The tensile strength and elongation properties are generally inverse of each other. Thus, trade-offs occur for the tensile strength and elongation properties of the webbing straps 160. There are additional specialty webbings in the industry with additional tensile and elongation characteristics that are mandated in the auto racing circuits and may also be considered, but traditional automotive industry webbing may be sufficient for implementation of the EMSS assemblies 95, 97 described herein.

The webbing straps 160 have multiple join sews 200 and tear away stitches 210 sewn into the webbing straps 160. The number of webbing straps 160 may vary depending upon the area below the seat bottom assembly 95 and loads that should be managed. For example, the seat 90 may include one or more webbing straps 160, two or more webbing straps 160, three or more webbing straps 160, four or more webbing straps 160, or five or more webbing straps 160.

FIG. 3 is a cross-sectional view of a seat bottom assembly 95 of FIG. 2. The seat bottom assembly 95 includes a seat bottom frame 100, a seat bottom plate 150, webbing straps 160, a stiffener 170, a webbing ratchet 180, and tear away stitches 210. The webbing ratchet 180 includes a bolt 250, a washer 260, and a nut 270. The seat bottom assembly 95 includes sheathing 280. Opposite of the seat bottom plate 150, the webbing straps 160 pull through a gated buckle 220 and wrap around the front side of the seat bottom frame 100 so that the webbing straps 160 pull through the gated buckle 220 and form a complete loop. The gated buckle 220 stops sliding on the webbing straps 160 at detents 240 so that unnecessary sliding of the webbing straps 160 does not occur. A layer of the sheathing 280 covers the seat bottom frame 100 so that the webbing strap 160 can wrap around seat bottom frame 100 without the webbing straps 160 directly touching the seat bottom frame 100. The seat bottom frame 100 connects with a seat bottom plate 150 that supports the bottom of a seated occupant. The seat bottom plate 150 attaches to a base of the webbing ratchet 180 by the bolt 250, the washer 260, and the nut 270, and the webbing ratchet 180 connects at the front side of the seat bottom plate 150 by the base. Another stiffener 170 is located opposite of the webbing ratchet 180 relative to the base of the webbing ratchet 180.

Figure 4:
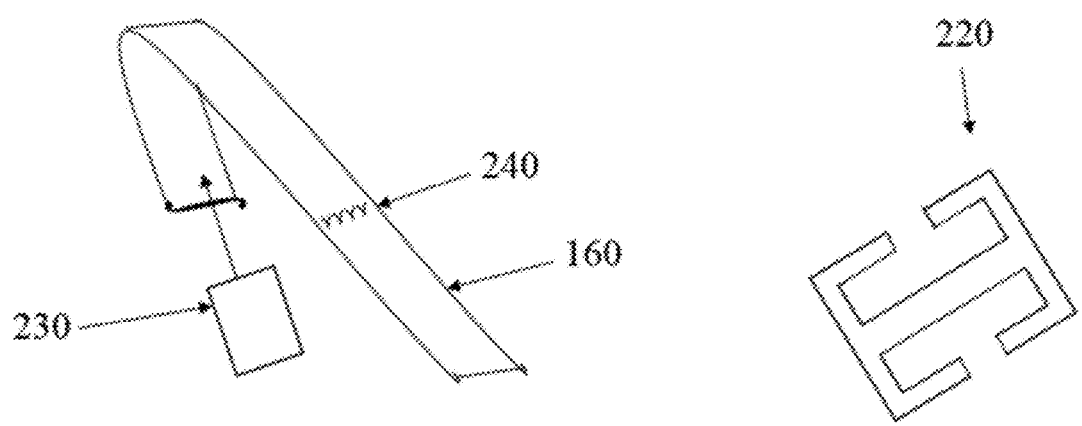
FIG. 4 is an exploded view of the gated buckle, the webbing strap, and the reinforcement patch of the FIG. 3.

FIG. 4 is an exploded view of the webbing strap 160, the gated buckle 220, and the reinforcement patch 230 of FIG. 3. The gated buckle 220 slides along the webbing strap 160, and the sliding motion of the gated buckle 220 is stopped by the reinforcement patch 230 and/or detents 240 on the webbing strap 160.

The gated buckle 220 can be a stamped metal part or formed from other high-strength material. The gated buckle 220 may be approximately four inches by three inches. The gated buckle 220 may include vertical openings in the outer perimeter of the gated buckle 220 that leads to two or more individual horizontal slots. The individual horizontal openings may be approximately ½-inch wide and provide a means to install and secure the loop in the webbing strap 160 onto the horizontal cross member of the gated buckle 220. Two openings exist at the border of the gated buckle 220 that permit the gated buckle 220 to be attached to the webbing strap 160. A horizontal cross member is located between the horizontal slots.

The reinforcement patch 230 is used for the join sew 200 to provide an additional retention feature to the join sew 200. The reinforcement patch 230 may be manufactured from a mesh-woven material and positioned between the folded webbing straps 160. The length and width of the reinforcement patch 230 may be approximately a two-inch square. The reinforcement patch increases the structural integrity of the stitch for the webbing strap 160 loop that secures the gated buckle 220 to the webbing strap 160. At one end of the webbing strap 160 the loop is created by folding approximately three inches of the webbing onto itself and the reinforcement patch 230 is positioned between the folded webbing strap 160. The join sew 200 is sewn through the webbing straps 160 and reinforcement patch 230 to create a loop in the webbing strap 160

The detent 240 is created in the webbing strap 160 by folding the webbing strap 160 and sewing the join sew 200 approximately ¼-inch of webbing together across the webbing strap 160. The detent 240 is sewn into the webbing strap 160 to facilitate the installation of the webbing straps 160 onto the seat bottom frame 100. The detent 240 is a visual identifier for a desirable position of the gated buckle 220 onto the webbing strap 160 once the gated buckle 220 is in the installed.

Referring back to FIG. 2, a series of tear away stitches 210 are embedded perpendicularly across the webbing straps 160. The tear away stitches 210 are configured to rip when specified loads are applied. The stitch pattern may not be identical for all tear away stitches 210. The type of thread for the stitch, the number of tear away stitches 210, the stitches per inch, and stitch pattern may vary depending upon the loads that are managed. The tensile strength used to activate the tear away stitches 210 can be increased or decreased. Common techniques for managing the tensile strength are the type of webbing material, type of thread used for the tear away stitching, the number of stitches per inch used, and the pattern of a stitch. The tear away stitches 210 may be applied to the webbing strap 160 after folding approximately four inches of the webbing strap 160 and joining the material with join sews 200. The tear away stitches 210 may be stitched to an approximate two inches of a double ply of the webbing straps 160.

The tear away stitches 210 can be adjusted for the required load to activate the tear away stitches 210. The tear away stitches 210 are sewn through two ply of the webbing straps 160 across a longitudinal axis so that the webbing straps 160 are partially looped or folded at locations of the respective tear away stitches 210. The tear away stitches 210 are configured to rip and increase a length of the webbing straps 160 in response to experiencing an above threshold load in a direction perpendicular (e.g., +/−Z) to a seat plate. Once the specified loads are achieved, that is, loads above the pre-determined threshold, the join sews 200 and tear away stitches 210 rip during the activation and releases the excess material of the fold. Multiple tear away stitches 210 may be sewn into the webbing strap 160. The number of tear away stitches 210 and load applied to activate the tear away stitches 210 may be variable, that is, dependent upon the use case for a given assembly. Additionally, multiple assemblies could be useful in the implementation of the tear away stitches 210.

The stiffeners 170 are generally positioned at forward and rearward locations of the webbing straps 160 so as to not interfere with any of the joins sews 200, the tear away stitches 210, or the webbing strap 160. The stiffeners 170 may be manufactured from a polypropylene plastic material that is approximately 1½-inch and ⅜-inch thick. Locators may be placed on the webbing straps 160 to provide the stiffeners 170 with a vertical location to be installed. The stiffeners 170 may have three sets of locators to horizontally locate or position the stiffeners 170 onto the webbing straps 160. The stiffeners 170 overlap the three webbing straps 160, and the join sew 200 secures the stiffener 170 to each of the three webbing straps 160. The stiffeners 170 ensure there is a consistent, pre-configured distance between each webbing strap 160. The stiffeners 170 aid in the handling of the webbing straps 160, which is beneficial for the installation to the seat bottom plate 150 and seat bottom frame 100.

Figure 5:
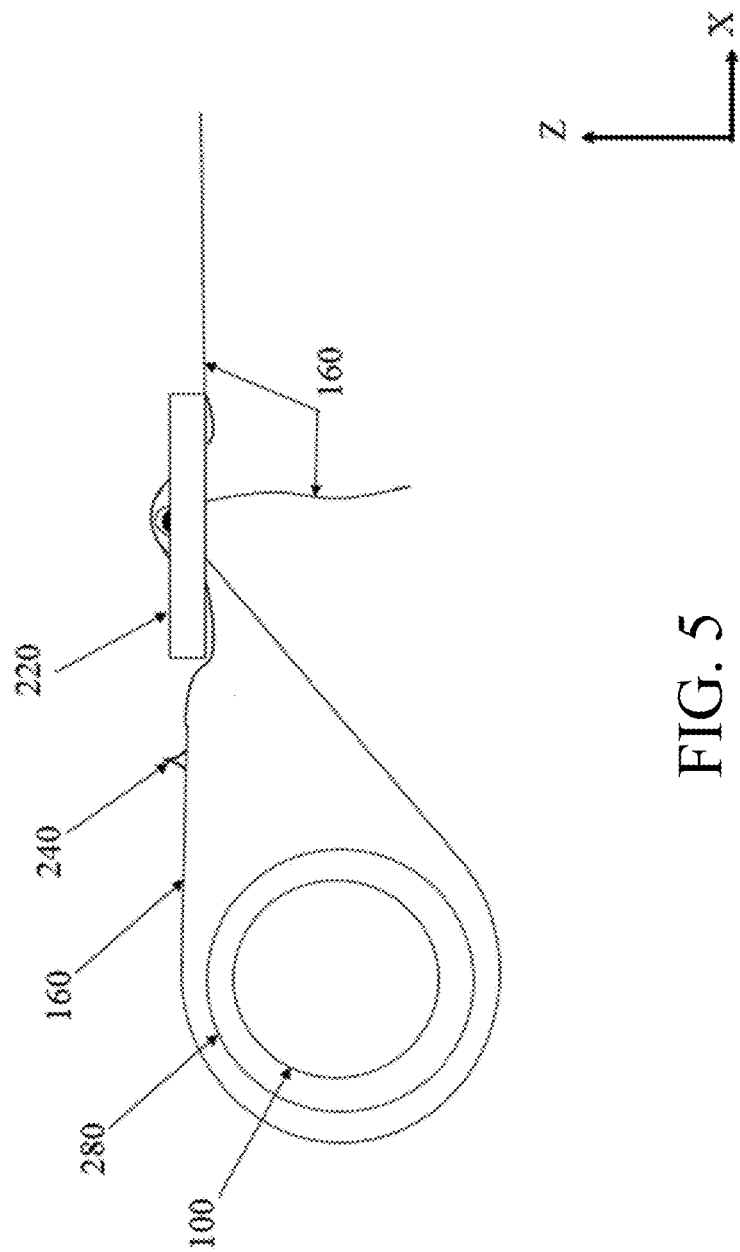
FIG. 5 is a cross-sectional view of the webbing strap and a front portion of the seat bottom frame of the seat bottom assembly of FIG. 2.

FIG. 5 is a cross-sectional view of the webbing strap 160 secured to a front portion of the seat bottom frame 100 of the seat bottom assembly 95 of FIG. 2. The webbing strap 160 includes a gated buckle 220 and a detent 240. The gated buckle 220 is located on the webbing strap at a side that is opposite horizontally of the seat bottom plate 150. The gated buckle 220 is interfaced with, for example, attached to the loop of the webbing strap 160. Before wrapping the webbing strap 160 around the adjacent horizontal cross member of the seat bottom frame 100, sheathing 280 that is protective is installed around the front horizontal surfaces where the webbing straps 160 interface with the seat bottom frame 100.

The sheathing 280 provides protection to the seat bottom frame 100. The sheathing 280 provides a surface for the webbing straps 160 to secure around the front portion of the seat bottom frame 100. The sheathing 280 may be comprised of a rigid fabric material or polypropylene plastic material. If the pre-defined alignment locators on the seat bottom frame 100 cross member are hidden as a result of the installation of the sheathing 280, the locators should be transposed onto the sheathing 280. The sheathing 280 provides a barrier to mitigate burrs or sharp objects on the seat bottom frame 100 from scuffing the webbing straps 160. Unprotected rough edges or burrs can be abrasive to the webbing straps 160 and jeopardizes the structural integrity of the webbing straps 160.

Referencing back to FIG. 3, the webbing strap 160 that is aligned with the gated buckle 220 may be located onto the seat bottom frame 100 cross member with locators and wrapped around the front horizontal section of the sheathing 280 that covers the seat bottom frame 100. The two vertical openings of the perimeter of the gated buckle 220 provide the opportunity to secure the gated buckle 220 onto the webbing strap 160. Once secured onto the webbing strap 160, the gated buckle 220 is pushed along the webbing strap 160 toward the detent 240. The webbing straps 160 may be loose, secured, taut, tight or a combination thereof relative to the horizontal cross member of the seat bottom frame 100. The looseness of the webbing straps may be dependent on whether the seat bottom assembly has deployed and ripped the tear away stitches 210, as described below in reference to FIG. 6. Other webbing straps 160 may be aligned and secured in a similar fashion along front horizontal cross member the seat bottom frame 100.

The webbing ratchets 180 are used to manually secure the opposite end of the webbing straps 160. The webbing ratchets 180 have a manual gear mechanism that is connected to a slotted spool. Generally, the end of the webbing strap 160 is pulled taut without any folds, aligned to the locators on the horizontal cross member of the seat bottom frame 100, as shown in FIG. 4, and inserted into the slotted spool. A gear mechanism of the webbing ratchet 180 is cranked with the use of a socket wrench or other similar means. The spool of the webbing ratchet 180 rotates and tension is applied to the webbing straps 160. The webbing ratchets 180 may be any ratchet known to one skilled in the art. The webbing ratchets 180 are ratcheted until tension is applied to the webbing straps 160. As tension increases on the webbing straps 160, the slack in the webbing diminishes, and the cleats of the gated buckle 220 are forced to slide along the webbing strap 160 and nests at the detent 240 that is sewn into a separate portion of the webbing straps 160.

The approximate specified tension is applied to the webbing straps 160. Additional tooling may be used to verify when the specified tension is applied to the webbing straps 160. The webbing straps 160 may maintain alignment with the locators on the seat bottom frame 100 front horizontal cross-member. The additional tooling may include a belt tension gage that is used to determine the tension on the webbing straps 160. If increasing of the tension on the webbing straps 160 is required, the webbing ratchet 180 is ratcheted to apply additional tension onto the webbing strap 160. If tension on the webbing straps 160 should be decreased, the webbing ratchet 180 may be decreased by disengaging a pawl of the webbing ratchet 180. The spool of the webbing strap 160 is relaxed and decreases the tension on the webbing strap 160 and pawl is re-engaged. The process is repeated until the specified tension of the webbing strap 160 is achieved. A belt tension gage may be used to confirm the specific tension of the webbing strap 160. The tweaking of the tension of the webbing strap 160 to the specified tension is repeated until the proper tension on the webbing strap 160 is achieved.

The natural seating position of the restrained occupant applies a greater amount of mass of the occupant to the seat bottom assembly 95 than the seat back assembly 97. In addition, the seat back frame 110 rests on top of a back of the seat bottom frame 100. Consequently, the seat bottom frame 100 increases the structural integrity of the seat back assembly 97 by providing additional support during an underbody event.

Figure 6:
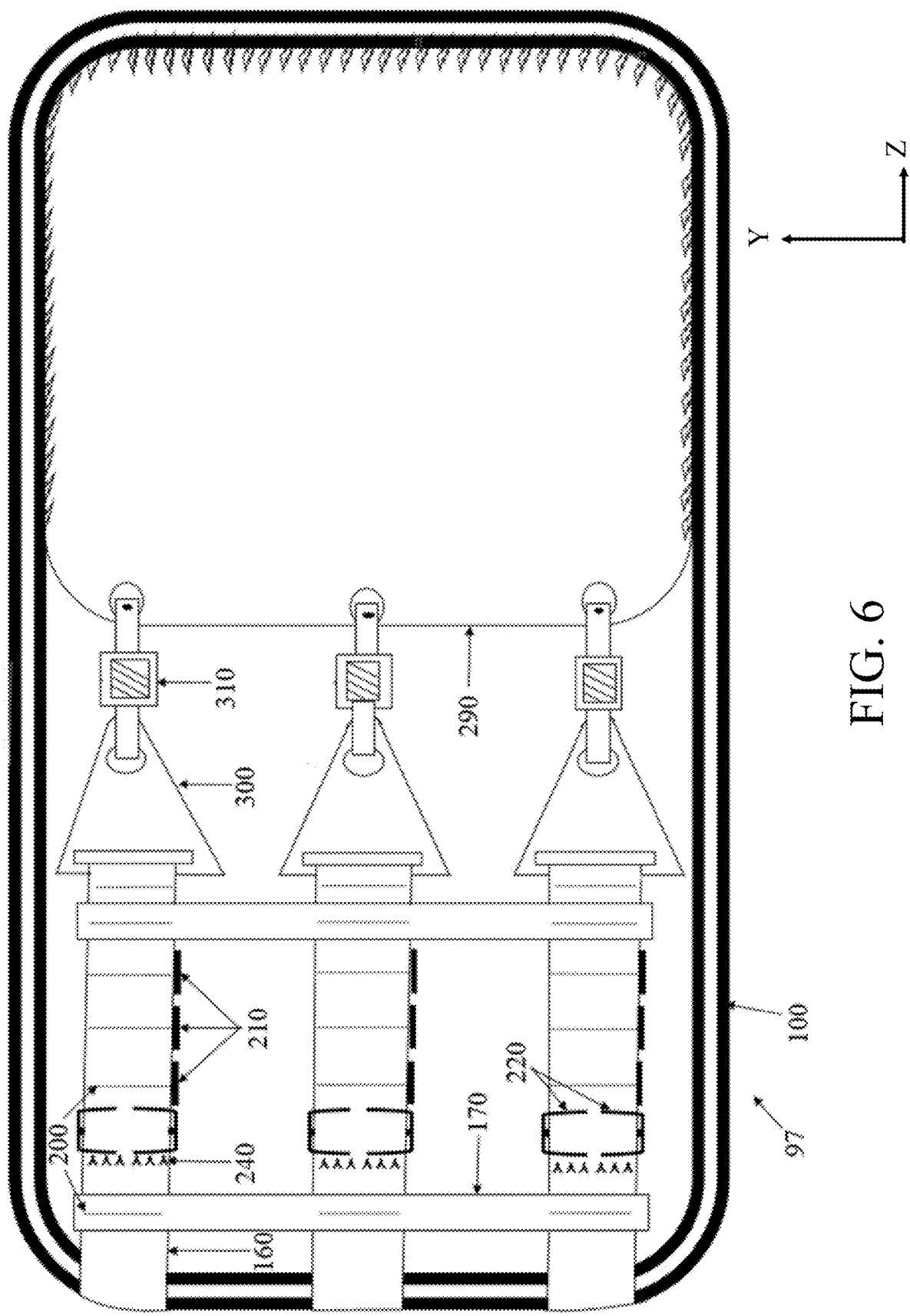
FIG. 6 is a front view of the seat back assembly that includes the seat back frame of FIG. 1.

FIG. 6 is a front view of a seat back assembly 97 that includes the seat back frame 110 of FIG. 1. The seat back assembly 97 deploys in similar manner to the seat bottom assembly 95 in FIG. 2. The seat back assembly 97 may include similar components to the seat bottom assembly 95. The seat back assembly 97 includes the seat back frame 110, the webbing straps 160, the stiffener 170, join sews 200, tear away stitches 210, detents 240, a seat back plate 290, D-rings 300, and hook-to-jaw turn buckles 310. The seat back plate 290 is welded to at a top side, a right side, and a left side of the seat back frame 110. The seat back plate 290 covers about half of the internal surface on the seat back frame 110 on the bottom side of the seat back frame 110. Pins of the hook-to-jaw turn buckle 310 connect the D-ring 300 and the seat back plate 290. Each webbing strap 160 connects with the seat back frame 110 and a separate D-ring 300. The webbing straps 160 include at least one tear away stitch 210 that rips when an impact force is applied to the seat back assembly 97. The joins sews 200 secure the stiffeners 170 on the webbing straps 160. Separate join sews 200 provide a controlled surface on the webbing strap 160 so the tear away stitches 210 can be sewn onto the webbing straps 160.

The seat back plate 290 may be similar to the seat bottom plate 150. Generally, the seat back plate 290 does not have cut outs on either side, a trench routed into the B-surface of the seat back plate 290, webbing ratchet 180, and locators are used to position the webbing ratchets 180. The seat back plate 290 does provide additional structural integrity to the seat back frame 110 that may manage the X directional loads induced onto the seat back frame 110 as opposed to the Z directional loads induced upon the seat bottom frame 100. The seat back plate 290 has three sets of holes, and one of the holes is for the attachment of the hook-to-jaw turn buckle 310 and the other holes are for the attachment of the protective sleeves 190. The seat back plate 290 is comprised of similar material as the seat bottom plate 150. The seat back plate 290 may have less elongation properties than the seat bottom plate 150 because the controlled deformation may not activate the tear away stitches 210 in the webbing straps 160. The tensile strength properties of the seat back plate 290 should be sufficient to withstand loads to activate the tear away stitches 210 in the webbing straps 160.

The webbing straps 160 of the seat back assembly 97 manages the loads that are transposed onto to the webbing straps 160 of the seat bottom assembly 95, and the webbing straps 160 of the seat back assembly 97 also deploy similarly to the webbing straps 160 of the seat bottom assembly 95. The seat back assembly 97 may include one or more, two or more, three or more, four or more, or a plurality of webbing straps 160. The webbing straps 160 of the seat back assembly 97 may have a robust tensile strength for the activation of the tear away stitches 210. The webbing straps 160 generally have greater elongation properties to provide more protection to the restrained occupants by inducing less impulse onto the occupant. The webbing straps 160 of the seat back assembly 97 may have many of the same features that are embedded into the webbing straps 160 of the seat bottom assembly 95, which may include robust join sews 200 to form a loop at the end of the webbing strap 160 for the installation of the gated buckle 220.

The opposing end of the webbing strap 160 is attached to a D-ring 300 with the join sew 200. The D-ring 300 may be manufactured of steel and have one slot approximated 3 inches×¾-inch and one hole approximately ¾-inch diameter. The D-ring 300 may be manufactured from high strength steel and the eyelet of the D-ring 300 may be covered with a coating similar to polyurethane. The coating would be heat treated to reduce the occurrence of the webbing from contacting any sharp edges or burrs that may exist on the D-ring 300. Approximately two inches of the end of the webbing strap 160 is generally threaded through the slot of the D-ring 300. The end of the webbing strap 160 is folded and positioned onto the webbing strap 160 capturing the D-ring 300 and joined with the join sew 200.

The remaining webbing straps 160 of the seat back assembly 97 are sewn with similar join sews 200, detents 240, and multiple tear away stitches 210 as the webbing straps 160 of the seat bottom assembly 95. The webbing strap 160 of the seat back assembly 97 includes material, stitches per inch for the tear away stitches 210, and the stitch pattern may optimize the assemblies for protection of the occupants in an upright position.

The seat back plate 290 is located parallel to the top horizontal perimeter of the seat back frame 110. Generally, pre-defined locators on the seat back frame 110 and seat back plate 290 should be aligned. The seat back plate 290 is installed with a continuous weld along the interface at the top and side portions of the seat back plate 290 and the seat back frame 110. The sheathing 280 is installed onto the lower cross member of the seat back frame 110 to protect the webbing straps 160 from being exposed to burrs and sharp edges. The webbing straps 160 are generally positioned over the lower horizontal cross bar of the seat back frame 110.

The installation of the webbing straps 160 of the seat back assembly 97 is conducted in the same manner as the installation of the webbing straps 160 and the gated buckle 220 of the seat bottom assembly 95. The webbing strap 160 is wrapped around the sheathing 280 on the lower cross member of the seat back frame 110. The gated buckle 220 is attached to the webbing strap 160 in the same manner as the installation of the webbing strap 160 to the gated buckle 220 for the webbing strap 160 of the seat bottom assembly 95. The installation of the gated buckles 220 and webbing straps 160 of the seat bottom assembly 95 are repeated for the additional webbing straps 160.

The hook-to-jaw-turn-buckles 310 have a hook at one end and a yolk with a pin at the other end. The hook portion of the hook-to-jaw turn buckle 310 is installed into the hole of D-ring 300. After the pin is removed from the yoke, the holes on the yoke are aligned to the hole in the seat back plate 290. The pin is secured to the yoke, attaching the hook-to-jaw turn buckle 310 to the seat back plate 290. Other coupling types beyond pins through holes are also possible, such as interfacing, attaching, stitching, connecting, or linking. The hook-to-jaw turn buckle 310 installation is repeated for all of the webbing straps 160 of the seat back assembly 97.

The hook-to-jaw turn buckles 310 are separately rotated and the webbing straps 160 are tightened to increase the tension of the webbing strap 160. While tension is added to the webbing straps 160, the webbing straps 160 are positioned to be aligned with the locators on the lower horizontal cross member on the seat back frame 110. The hook to jaw turn buckles 310 are rotated by keeping the webbing straps 160 in proper alignment to the locators until the specified tension is attained onto the webbing straps 160. The tension on the webbing straps 160 of the seat back assembly 97 is verified in the same manner as the tension for the webbing straps 160 of the seat bottom assembly 95. The hook-to-jaw turn buckles 310 have a similar capability to increase or decrease the webbing strap 160 tension and, thus, completing installation of the seat back assembly 97 with the exception of installing the protective sleeves 190.

Figure 7:
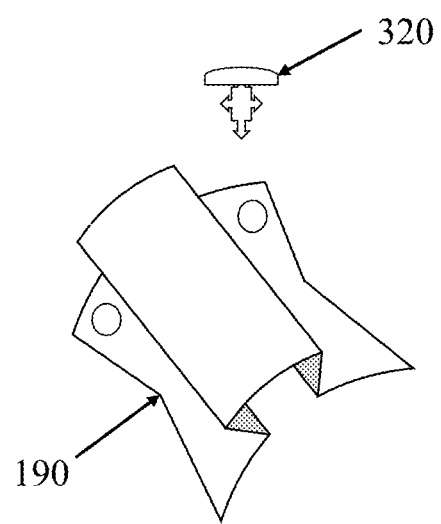
FIG. 7 is an exploded view of a protective sleeve and an XMAS tree of a seat bottom assembly, such as the seat bottom assembly of FIG. 2.

FIG. 7 is an exploded view of a protective sleeve 190 and an XMAS tree 320 that is secured to a seat bottom assembly 95, such as the seat bottom assembly 95 of FIG. 2. The protective sleeve 190 may function as a precautionary heat resistant cover that may be applied over one, several, or all of the webbing straps 160 to minimize the exposure to extreme hot temperatures and also provides protection from sharp edges that may inherently damage the webbing straps 160 during general use. The protective sleeves 190 may be formed from flexible. fire retardant material that has male and female Velcro. The protective sleeves 190 may separately protect each of the webbing straps 160. The protective sleeves 190 can be generally secured in position with the Velcro or any other connection means sufficient to attach the protective sleeves 190 to the webbing straps 160.

The protective sleeves 190 on the seat back assembly 97 and the seat bottom assembly 95 may differ with regard to what hardware that the protective sleeves 190 protect. For example, the protective sleeves 190 for the seat bottom assembly 95 can protect the webbing straps 160 in the webbing ratchets 180. In another example, the protective sleeves 190 for the seat back assembly 97 can protect the webbing straps 160, the D-rings 300, and the hook-to-jaw turn buckle 310. Each protective sleeve 190 can be secured with at least two XMAS trees 320 through two holes in the protective sleeve 190 and two holes in the seat bottom plate 150 and/or seat back plate 290. The protective sleeves 190 are installed after the webbing straps 160 are at the proper specified tension in both the seat back assembly 97 and the seat bottom assembly 95. The webbing straps 160 can be protected using the protective sleeves 190 so the occupant after the +Z travel is provided with the additional protection during the −Z travel of a high impact event.

Figure 8:
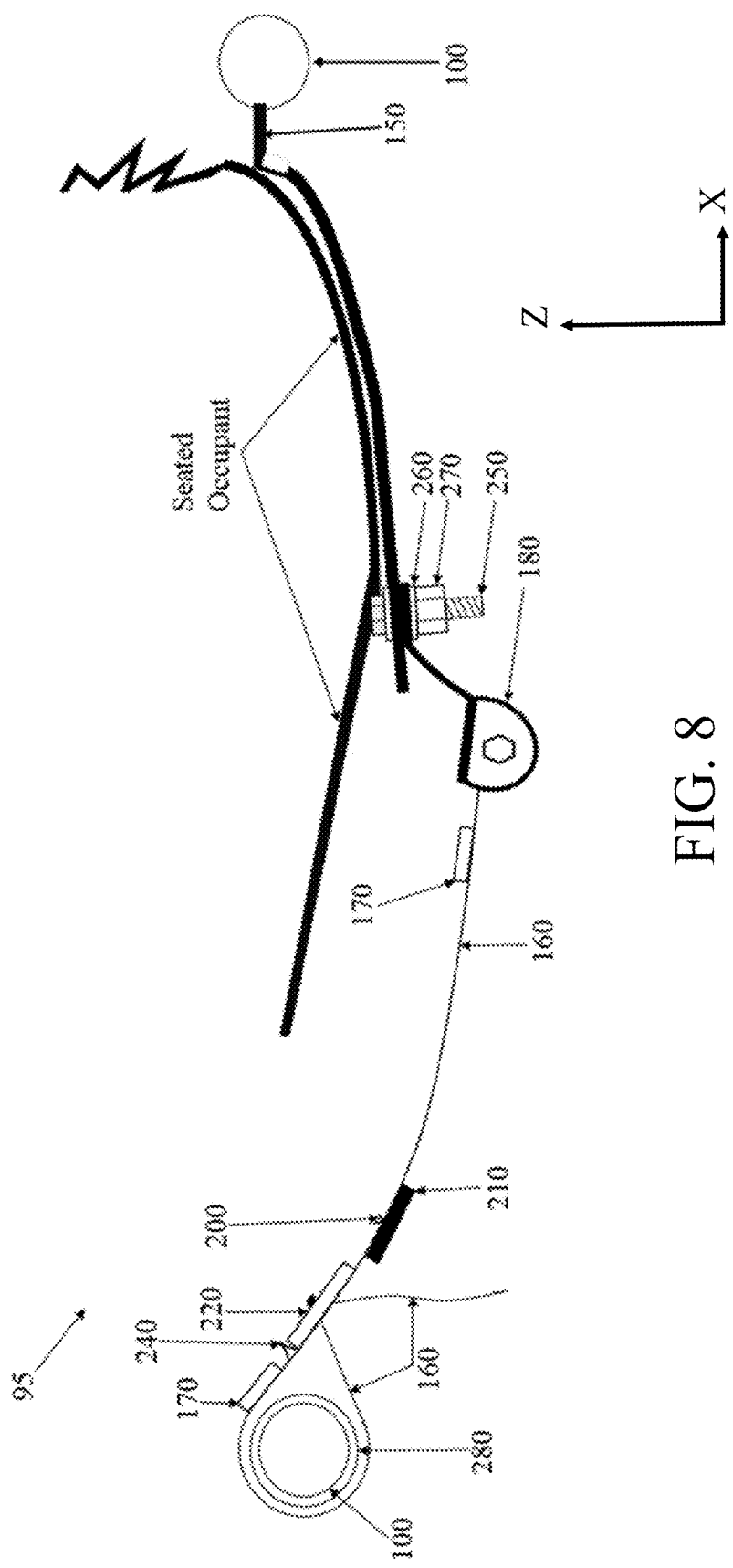
FIG. 8 is a cross-sectional view of the seat bottom assembly that is occupied after +Z travel of the seat bottom assembly of FIG. 2.

FIG. 8 is a cross-sectional view of the seat bottom assembly 95 that is occupied after +Z travel on the seat bottom frame 100 of FIG. 1. The seat bottom assembly 95 includes a seat bottom frame 100, a seat bottom plate 150, a webbing strap 160, a stiffener 170, a webbing ratchet 180, and tear away stitches 210. The webbing ratchet 180 includes a bolt 250, a washer 260, and a nut 270. The seat bottom plate 150 includes sheathing 280. Opposite of the seat bottom plate 150, the webbing straps 160 pull through a gated buckle 220 and wrap around the front side of the seat bottom frame 100 so that the webbing straps 160 pull through the gated buckle 220 and form a complete loop. The gated buckle 220 stops sliding on the webbing straps 160 at detents 240 so that unnecessary sliding of the webbing straps 160 does not occur. A layer of the sheathing 280 covers the seat bottom frame 100 so that the webbing strap 160 can wrap around seat bottom frame 100 without the webbing straps 160 directly touching the seat bottom frame 100. The seat bottom frame 100 connects with a seat bottom plate 150 that supports the bottom of a seated occupant. The seat bottom plate 150 attaches to a bar of the webbing ratchet 180 by the bolt 250, the washer 260, and the nut 270, and the webbing ratchet 180 connects with the front side of the seat bottom plate 150 by the bar. Another stiffener 170 is located opposite of the webbing ratchet 180 relative to the bar of the webbing ratchet 180.

The EMSS assemblies, including the seat bottom assembly 95 and the seat back assembly 97, may be exposed to extreme temperatures. To address temperature extremes, the seat belt webbing used for the webbing straps 160 of the seat bottom assembly 95 and the seat back assembly 97 may be compliant to FMVSS 302. FMVSS 302 is a standard that requires burn rate testing of the webbing.

During an event loads mitigate through the vehicle structure to the occupied seat 90. Loads are typically then transferred onto the seat bottom assembly 95 and then onto the seat back assembly 97. The seat bottom assembly 95 and the seat back assembly 97 have additional loads applied by the restrained occupant. Severity of the loads transferred to the seat assemblies is dependent upon the size of a high impact event, the vehicle structure, the seat structure, and the size, weight, and seating location of the restrained occupant relative to the location of the high impact event.

After high impact impulse tremor through a vehicle, the restrained occupant is forced into the seat bottom assembly 95 as the seat 90 is projected in a +Z direction at a high rate of speed.

Figure 9:
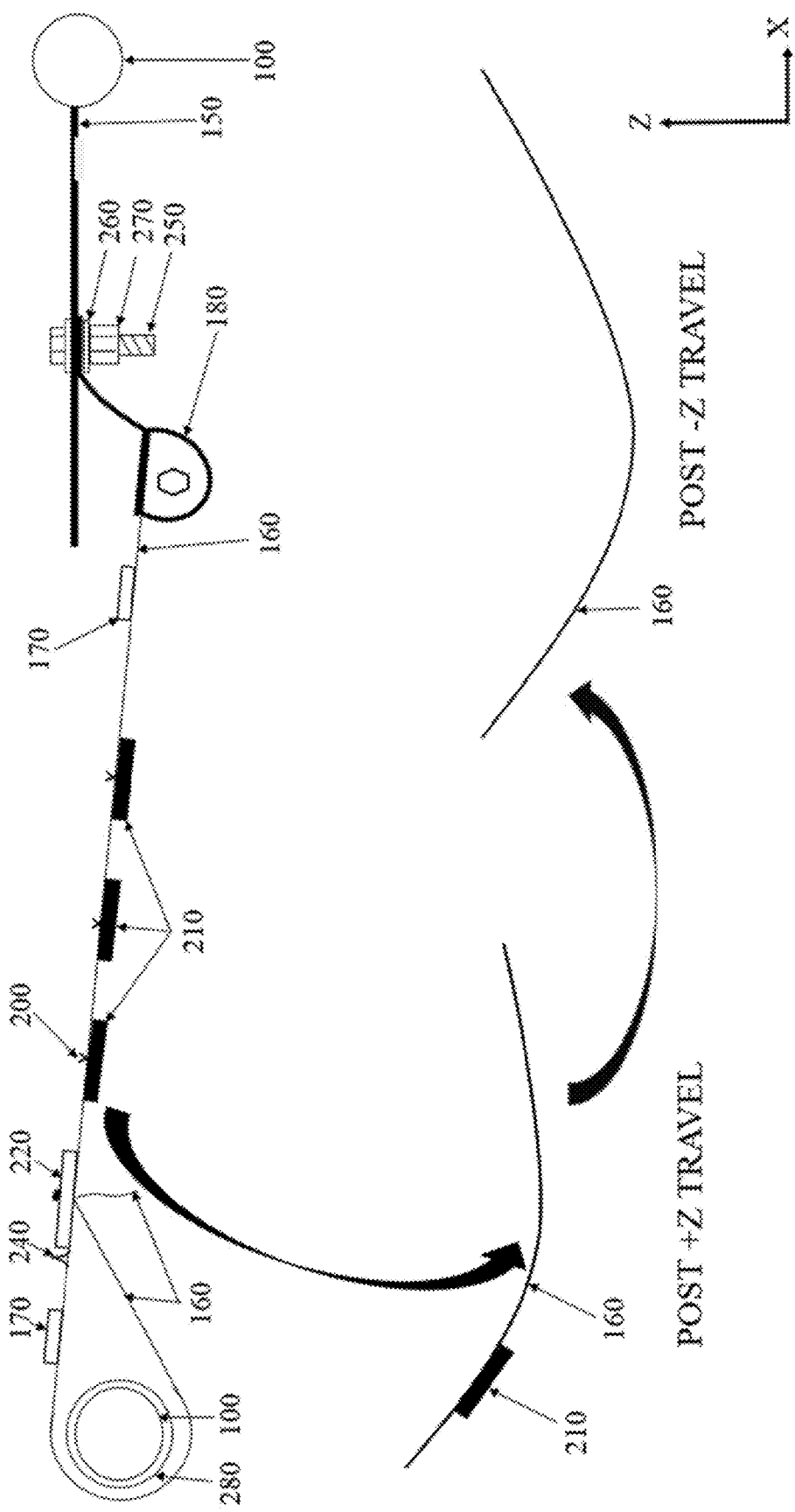
FIG. 9 is a cross-sectional view of the seat bottom assembly after +Z and −Z travel of the seat bottom assembly of FIG. 2.

FIG. 9 is a cross-sectional view of the seat bottom assembly 95 after +Z and −Z travel of the seat bottom assembly 95 of FIG. 2. The seat bottom assembly 95 includes a seat bottom frame 100, a seat bottom plate 150, a webbing strap 160, a stiffener 170, a webbing ratchet 180, and tear away stitches 210. The webbing ratchet 180 includes a bolt 250, a washer 260, and a nut 270. The seat bottom plate 150 includes sheathing 280. Opposite of the seat bottom plate 150, the webbing straps 160 pull through a gated buckle 220 and wrap around the front side of the seat bottom frame 100 so that the webbing straps 160 pull through the gated buckle 220 and form a complete loop. The gated buckle 220 stops sliding on the webbing straps 160 at detents 240 so that unnecessary sliding of the webbing straps 160 does not occur. A layer of the sheathing 280 covers the seat bottom frame 100 so that the webbing strap 160 can wrap around seat bottom frame 100 without the webbing straps 160 directly touching the seat bottom frame 100. The seat bottom frame 100 connects with a seat bottom plate 150 that supports the bottom of a seated occupant. The seat bottom plate 150 attaches to a base of the webbing ratchet 180 by the bolt 250, the washer 260, and the nut 270, and the webbing ratchet 180 connects with the front side of the seat bottom plate 150 by the base. Another stiffener 170 is located opposite of the webbing ratchet 180 relative to the base of the webbing ratchet 180. The webbing straps 160 form four loops or folds of webbing straps 160 at the tear away stitches 210 that are configured to rip upon the occurrence of an unanticipated force.

The bottom of the occupant loads into the seat bottom assembly 95. The restrained occupant hips are forced downward and forward as the upper torso projects forward. The occupant's chest and knees are projected into a fetal position. The load induced by the restrained occupant is mitigated by the yielding of the spot welds that are forward of the cutouts in the seat bottom plate 150. The seat bottom plate 150 deforms along the weakest location which is the routed trench along the width of the seat bottom plate 150 B-surface. A controlled downward deformation of the seat bottom plate 150 occurs once sufficient loads are applied to the front of the seat bottom plate 150. As the controlled deformation occurs, the webbing straps 160 that are secured to the front cross member of the seat bottom frame 100 elongate as increasing tension is applied. The tension on the webbing straps 160 rips the tear away stitches 210 and unfolds the folded webbing straps 160 that was compacted by the tear away stitches 210. A progression of additional tear away stitches 210 integrated into the webbing straps 160 continues to rip as ample load is applied and mitigates the overall force placed on the occupant. Specifically, the EMSS assemblies 95, 97 minimizes the +G forces of the restrained occupant.

After the restrained occupant is positioned into the fetal position, the lower lumbar region of the occupant is forced rearward applying load into the seat back assembly 97. The load of the restrained occupant applies tension against the webbing straps 160 of the seat back assembly 97 and activates the tear away stitches 210. The tear away stitches 210 react in a similar manner as the tear away stitches 210 that react in the seat bottom assembly 95. However, the deformation of the seat back plate 290 is not imminent to activate the tear away stitches 210 of the seat back assembly 97. The seat back assembly 97 provides protection and decreases impulses induced onto the restrained occupant.

After the initial high impact resulting in +Z travel, the second impact is known as the slam-down phase, during which protection to the occupant is equally important to provide adequate occupant isolation. The −G forces of the second impact are associated with −Z travel. Most seats or seat suspensions resources are activated during the +Z travel of +G forces (i.e., the forces of the initial high impact) of the restrained occupants and provide limited, if any additional occupant protection for the −G forces. Often the occupants are partially injured as a result of the +G forces and require additional protection that often is not provided to the restrained occupants. Although impulses are reduced for the −G forces and −Z travel, the EMSS assemblies 95, 97 are designed to provide additional protection to the restrained occupant during −G forces. After the +Z travel and +G forces, additional tear away stitches 210 in the seat bottom assembly 95 and the seat back assembly 97 are activatable. The additional protection provides the capability to protect against additional injuries.

After the activation of the additional tear away stitches 210, the webbing straps 160 of the seat bottom assembly 95 assume a hammock profile. The profile of the webbing straps 160 enables the restrained occupant to nest within the confinement of the seat 90. The webbing straps 160 are beneficial to support the restrained occupants with multiple degrees of freedom perspectives while mitigating the acceleration of the restrained occupants and improves the ability to protect the occupants.

Alternative attachment schemes may be considered for securing components to the seat bottom assembly 95 and seat back assembly 97. The use of an alternative spring loaded buckles onto the seat bottom plate 150 can avoid the use of the webbing ratchets 180 and the locator feature on the B-surface to locate the webbing ratchets 180. Spring loaded buckles may also be used on the seat bottom assembly 95 design to eliminate the D-ring 300 and hook-to-jaw turn buckle 310. Pass through slots may be used for each webbing strap 160 in the seat bottom plate 150 and seat back plate 290 at specific locations. The slots may be approximately 1-inch from the seat bottom plate 150 edge and 1-inch above the seat back plate 290 edge and approximately two inches wide with chambered edges. The slots may permit the webbing straps 160 to slide through the plates and be secured with spring loaded buckles.

The application of the spring loaded buckle may use a similar locator onto the webbing strap 160, such as the detent 240 for the aforementioned EMSS assemblies 95, 97. A loop or fold is sewn into the webbing straps 160 to capture the spring loaded buckle. The opposite end of the webbing straps 160 is routed around the cross member of the seat bottom frame or the seat back frame, through the slots in the seat bottom plate or seat back plate, and routed into a latching portion of the spring loaded buckle to a specified tension. The spring loaded buckles have the flexibility to increase or decrease the tension of the webbing strap 160. Additional locators may be used in the webbing straps 160 to apply the properly specified tension onto the webbing straps 160 for the engagement of the spring loaded buckles.

Several variables affect performance of the seat bottom assembly 95 and the seat back assembly 97. These variables include the thickness and material properties for the seat bottom plate 150, seat back plate 290, trench, webbing straps 160, and tear away stitches 210. Different materials are available for the manufacturing of the seat bottom plate 150, the seat back plate 290, the webbing straps 160 and the tear away stitches 210. For example, different material properties include different strength and elasticity characteristics. The material properties permit the seat bottom assembly 95 and the seat back assembly 97 to behave differently during mine blast events. The behavior of the tear away stitches 210 can also be altered by revising the thread type, stitches per inch, and the design pattern. The components of the seat bottom assembly 95 and the seat back assembly 97 may function in unison as a system. All of the components can be designed accordingly to maximize the protection for the restrained occupant.

The vehicle constraints also affect the performance of the seat bottom assembly 95 and the seat back assembly 97. For example, the surrounding environment of the seat 90 interacts as a result of an event. The area below the seat bottom assembly 95 (e.g., a vehicle floor) may deform and alter the available area below the seat 90 in which the webbing straps 160 to sag after the tear away stitches 210 are activated. The available area behind the seat back assembly 97 may also be limited as the restrained occupant travels during an event a predetermined distance without interfering with vehicle structure (e.g. a vehicle pillar or wall) during activation of the seat back assembly 97. If close proximity exists to either a vehicle floor or a vehicle pillar or wall during the activation of the seat bottom assembly 95 and/or the seat back assembly 97, the designs are flexible to ensure the occupant will not interfere with the vehicle structures during +Z and −Z travel. Modeling and simulation may be completed before the seat bottom assembly 95 and the seat back assembly 97 are designed to better protect the overall population of restrained occupants for use of the EMSS assemblies 95, 97.

The seat bottom assembly 95 and the seat back assembly 97 designs have the flexibility to counter multiple threats to the vehicle and occupants. The EMSS assemblies 95, 97 may be used for ground, front, rear, or top impacts depending on the configuration of the teachings herein.

The EMSS assemblies 95, 97 are also flexible for application to specific seating locations within vehicles with respect to the anticipated event. An event exposes the occupants to various loads relative to the occupant's seated location within the vehicle. The restrained occupants at the front of the vehicle typically will be exposed to greater loads due to the probability of high impact events occurring at the front of the vehicle. The EMSS assemblies 95, 97 can be fitted for the front, middle, and rear seating locations for multi-occupant carrying vehicles that should manage loads by seat location.

The EMSS assemblies 95, 97 are flexible to provide protection for all sized and shaped occupants. A wide spectrum of loads should be managed based on the population of the occupants. The flexibility to manufacture components in the EMSS assemblies 95, 97 from different materials and different material properties is available. The EMSS assemblies 95, 97 have additional design flexibility for the tear away stitches 210 that are available by altering the thread type, the stitches per inch count, and the stitch patterns. These variables may adjust the behavior of the EMSS assemblies 95, 97 in order to properly manage the loads.

The EMSS assemblies 95, 97 are adaptable to new or existing seat assemblies. Existing seat assemblies may require additional structural modifications for the seat cushion and/or seat back structure(s) to become more robust beyond the plates of the EMSS assemblies 95, 97. Other seat system components should be analyzed to determine if additional modifications such as, gussets added to the corners of the seat frames 100, 110 that can improve the structural integrity for the integration of the EMSS assemblies 95, 97.

The EMSS assemblies 95, 97 have unique design features dedicated to protecting to the restrained occupant after +Z travel. The additional tear away stitches 210 not activated during the +Z travel provide additional −Z travel protection for the restrained occupants.

The EMSS assemblies 95, 97 provide barriers (not shown) for the restrained occupants to overcome. The barriers are seat bottom plate 150 that is deformed and tear away stitches 210 that are ripped from the EMSS assemblies 95, 97. Activation of the EMSS assemblies 95, 97 throughout an event is time consuming for the restrained occupant to overcome by the occupants. This positively reduces the acceleration of the restrained occupant and reduces load sustained by the occupants.

The EMSS assemblies 95, 97 confine the restrained occupants within the webbing straps 160 of the seat 90. The webbing straps 160 provide the opportunity for additional movement with additional degree of freedom movement for the restrained occupant and decreasing the probability for injury.

The value of the EMSS assemblies 95, 97 is measured by the reduction of injury incurred by the occupants. The EMSS assemblies 95, 97 provide structural, non-rigid enhancements to a seat structure which ultimately benefits the restrained occupants with additional protection to counter loads from high impact events. The kinematics of the EMSS assemblies 95, 97 are less obtrusive to the restrained occupants than high impact seat suspensions that currently exist for military vehicles.

Although the disclosure has been explained in relation to its preferred embodiment, it is to be understood that many other possible modifications and variations can be made without departing from the spirit and scope of the disclosure as hereinafter claimed. While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications.

ELEMENT LIST

The following callouts and element numbers are used to identify the sub-assemblies and components in this document:

Seat 90
Seat bottom assembly 95
Seat back assembly 97
Seat bottom frame 100
Seat back frame 110
Head restraint frame 120
Seat bottom suspension 130
Seat back suspension 140
Seat bottom plate 150
Webbing strap 160
Stiffener 170
Webbing ratchet 180
Protective sleeve 190
Join sew 200
Tear away stitches 210
Gated buckle 220
Reinforcement patch 230
Detent 240
Bolt 250
Washer 260
Nut 270
Sheathing 280
Seat back plate 290
D-ring 300
Hook-to-jaw turn buckle 310
XMAS tree 320

What is claimed is:

1. A seat bottom assembly, comprising:
   a seat bottom frame having a front side and a back side;
   a seat plate having a front side and a back side, the back side of the seat plate coupled with the back side of the seat bottom frame;
   webbing straps coupled to and extending between the front side of the seat bottom frame and the front side of the seat plate; and
   tear away stitches that connect two points of the webbing straps along a longitudinal axis so that the webbing straps are partially looped at locations of the respective tear away stitches,
   wherein the tear away stitches are configured to separate and increase a length of the webbing straps in response to experiencing a threshold load in a direction perpendicular to the seat plate.

2. The seat bottom assembly of claim 1, further comprising:
   ratchets coupling a bottom surface of the front side of the seat plate and the webbing straps, the ratchets configured to tighten the webbing straps.

3. The seat bottom assembly of claim 2, wherein the ratchets are coupled to the front side of the seat plate by a bolt so that the seat plate distributes loads applied to the ratchets, the webbing straps, or both.

4. The seat bottom assembly of claim 1, wherein the webbing straps are coupled to the front side of the seat bottom frame by wrapping around the front side of the seat bottom frame.

5. The seat bottom assembly of claim 4, further comprising:
   buckles securing the webbing straps around the front side of the seat plate, the buckles configured to adjust slack of the webbing straps.

6. The seat bottom assembly of claim 4, further comprising:
   sheathing secured around the front side of the seat bottom frame and between the seat bottom frame and the webbing straps, the sheathing configured to protect the webbing straps from rubbing against sharp edges of the seat bottom frame.

7. The seat bottom assembly of claim 1, wherein each of the webbing straps includes at least three tear away stitches that connect different points of the webbing straps.

8. The seat bottom assembly of claim 1, further comprising:
   stiffeners securing the webbing straps and configured to prevent lateral movement of the webbing straps.

9. The seat bottom assembly of claim 8, wherein the stiffeners are secured to each webbing strap by join sews, the join sews preventing sliding movement of the stiffeners along each of the webbing straps.

10. The seat bottom assembly of claim 1, wherein the seat plate is welded to the seat bottom frame at a back side, a right side, and a left side, and wherein when a load a threshold load is experienced, the seat plate remains welded to the seat bottom frame.

11. A seat top assembly, comprising:
a seat top frame having a top side, a bottom side, and lateral sides;
a seat plate having a top side, a bottom side, and lateral sides, the top side and the lateral sides of the seat plate secured to the top side and a portion of the lateral sides of the seat top frame; and
webbing straps extending between the bottom side of the seat top frame and the bottom side of the seat plate, each of the webbing straps comprising:
tear away stitches connecting at least two portions of the respective webbing strap along a longitudinal axis of the tear away stitches so that a partial loop is formed in the webbing strap, the tear away stitches configured to release when a threshold force is applied to the seat plate or the webbing strap; and
a hook-to-jaw turn buckle connecting the webbing strap and the bottom side of the seat plate.

12. The seat top assembly of claim 11, further comprising:
stiffeners securing each of the webbing straps together so that horizontal movement of the webbing straps is prevented within the seat top frame.

13. The seat top assembly of claim 11, each of the webbing straps further comprising:
a D-ring connecting the hook-to-jaw turn buckle and the bottom side of the seat plate, the D-ring, the hook-to-jaw-turn buckle, or both configured to adjust slack of the webbing strap.

14. The seat top assembly of claim 11, each of the webbing straps further comprising:
a gated buckle securing a loop of the webbing strap that is wrapped around the top side of the seat top frame.

15. The seat top assembly of claim 14, each of the webbing straps further comprising:
detents positioned along the webbing strap and oriented toward the seat top frame, the detents being locators for the gated buckle so that the gated buckle is spaced a distance from the top side of the seat top frame.

16. A seat assembly, comprising:
a seat top assembly having a top edge, side edges, and a bottom edge; and
a seat bottom assembly having a rear edge connecting with the bottom edge of the seat top assembly, the seat bottom assembly comprising:
a seat bottom frame defining a front edge, the rear edge, and side edges of the seat bottom assembly;
a seat plate connecting with the rear edge and a portion of the side edges of the seat bottom frame and extending toward the front edge along the side edges;
webbing straps connecting the front edge of the seat bottom frame and the seat plate; and
tear away stitches connecting two or more points of the webbing straps along a longitudinal axis of the webbing straps so that the webbing straps are securely gathered at locations of the respective tear away stitches,
wherein the tear away stitches are configured to separate and increase a length of the webbing straps in response to experiencing a threshold load in a direction perpendicular to the seat plate.

17. The seat assembly of claim 16, wherein the seat bottom assembly further comprises:
stiffeners perpendicularly secured to the webbing straps and positioned between the seat plate and the seat bottom frame, the stiffeners configured to horizontally space each of the webbing straps at a consistent distance between each of the webbing straps.

18. The seat assembly of claim 16, wherein the seat bottom assembly further comprises:
ratchets connecting each of the webbing straps with the seat plate, the ratchets configured to tighten the webbing straps against the seat plate.

19. The seat assembly of claim 16, wherein the seat bottom assembly further comprises:
gated buckles securing loops for each of the webbing straps, each of the loops wrapped around the front edge of the seat bottom assembly.

20. The seat assembly of claim 16, wherein the seat top assembly further comprises:
a seat top frame defining the top edge, the side edges, and the bottom edge of the seat top assembly;
a seat top plate having a top edge, side edges, and a bottom edge, the top edge and the side edges of the seat top plate secured to the top edge and the side edges of the seat top frame;
webbing straps connecting the bottom edge of the seat top plate and the bottom edge of the seat top frame; and
tear away stitches releaseably connecting at least two portions of the webbing straps so that webbing straps are securely gathered at the respective tear away stitches, the tear away stitches configured to release when a threshold force is applied to the webbing straps or the seat top plate.

* * * * *